(12) United States Patent
Valluri et al.

(10) Patent No.: US 8,428,057 B2
(45) Date of Patent: Apr. 23, 2013

(54) OPTIMIZING RETURN TRAFFIC PATHS USING NETWORK ADDRESS TRANSLATION

(75) Inventors: Vamsidhar Valluri, Fremont, CA (US); Anantha Ramaiah, San Jose, CA (US); Kaushik Biswas, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1389 days.

(21) Appl. No.: 11/724,496

(22) Filed: Mar. 14, 2007

(65) Prior Publication Data
US 2008/0225888 A1 Sep. 18, 2008

(51) Int. Cl.
*H04L 12/28* (2006.01)

(52) U.S. Cl.
USPC .......................................... 370/389; 370/466

(58) Field of Classification Search .................... None
See application file for complete search history.

(56) References Cited

U.S. PATENT DOCUMENTS

| | | | |
|---|---|---|---|
| 7,042,876 B1 | 5/2006 | Jayasenan et al. | |
| 7,447,153 B2 * | 11/2008 | Klinker | 370/231 |
| 7,716,370 B1 * | 5/2010 | Devarapalli | 709/245 |
| 2002/0046348 A1 * | 4/2002 | Brustoloni | 713/201 |
| 2002/0145981 A1 * | 10/2002 | Klinker et al. | 370/244 |
| 2004/0004968 A1 * | 1/2004 | Nassar | 370/401 |

OTHER PUBLICATIONS

Cisco Systems, Inc., "Enhanced IP Resiliency Using Cisco Stateful Network Address Translation", White Paper, Cisco Systems, Inc., Published Oct. 28, 2004, 20 pages.

* cited by examiner

*Primary Examiner* — Steven H Nguyen
(74) *Attorney, Agent, or Firm* — Hickman Palermo Truong Becker Bingham Wong LLP

(57) ABSTRACT

In one embodiment, an apparatus comprises logic for optimizing return traffic paths using network address translation (NAT). The logic is operable to receive outbound data from a source node in a source network, and to replace a source address in a source address field in the outbound data with a first address from a first address pool associated with a first connection. The logic is operable to determine that return traffic on the first connection needs to be switched over to a second connection, where a second address pool is associated with the second connection. The logic is operable to generate a mapping that associates the first address with a second address from the second address pool and, based on the mapping, to replace the first address in the source address field in the outbound data with the second address. The logic is also operable to send the outbound data to the destination node over the second connection.

26 Claims, 5 Drawing Sheets

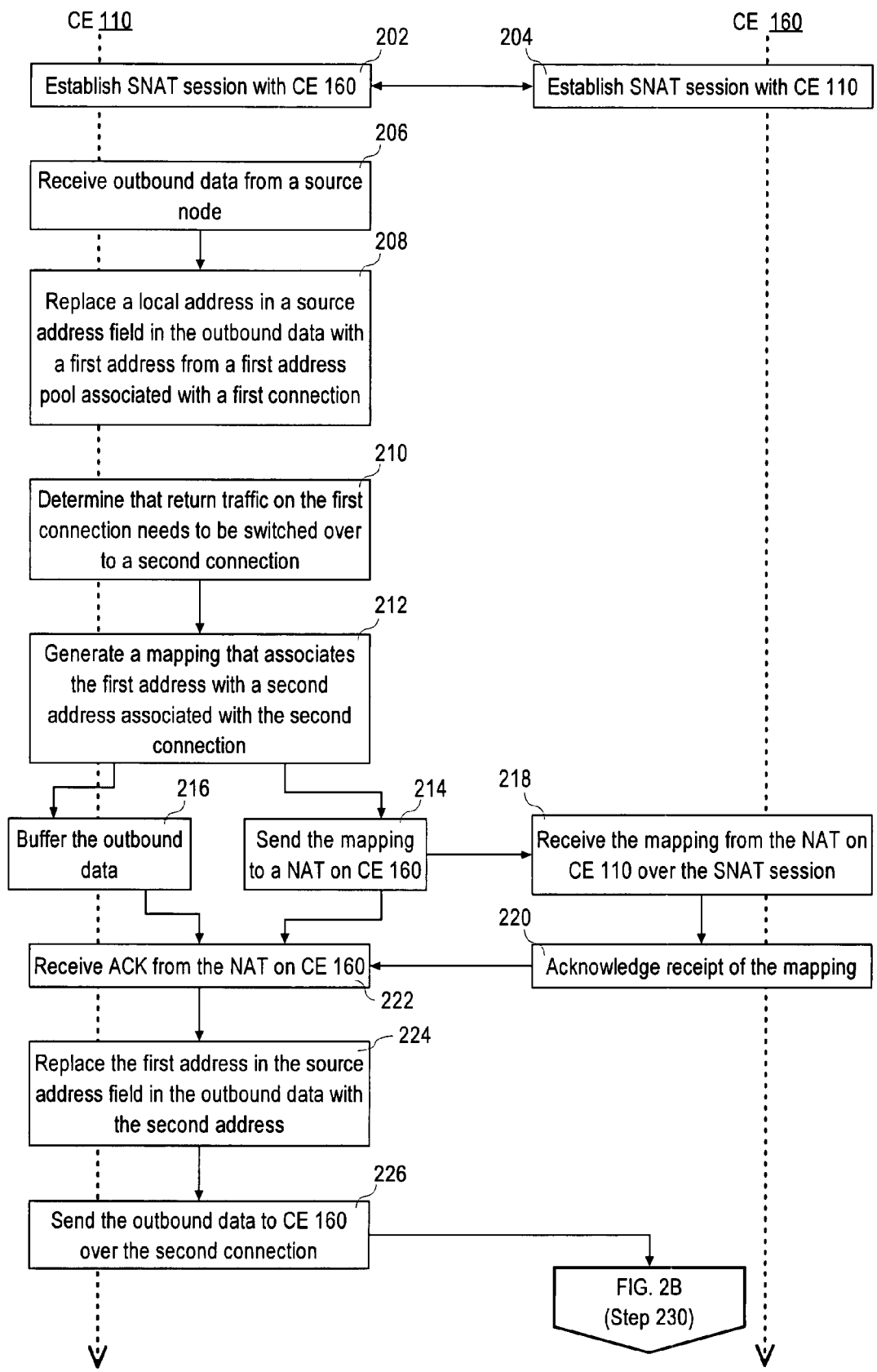

OPTIMIZING RETURN TRAFFIC PATHS USING NETWORK ADDRESS TRANSLATION

TECHNICAL FIELD

The present disclosure relates generally to network communications.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In some network deployments, a customer network may use multiple Internet Service Provider (ISP) connections to the Internet. For each connection of the multiple ISP connections, an ISP network would typically provide a small pool of Internet Protocol (IP) addresses that may be used to overload Internet-bound traffic sent from a node in the customer network. For example, a Network Address Translation (NAT) process executing in a router at the edge of the customer network would translate (or replace) a local IP address in outbound traffic to an IP address from the pool of IP addresses assigned to the router by the ISP network. In this way, a relatively large number of nodes in the customer network can use relatively few global IP addresses that can be reached through the ISP network.

In a customer network that uses multiple ISP connections, it is usually desirable to optimize routing for performance and load-balance of inbound and outbound traffic across all available ISP connections. However, optimizing and load-balancing of inbound (or return) traffic is difficult to achieve because inbound traffic relies on a return path which is determined by the IP address assigned to the corresponding outbound traffic by the NAT at the edge of the customer network. For example, in some operational scenarios it may be necessary to change the return path for inbound traffic when load-balancing on an inbound ISP connection needs to be performed or when an inbound ISP connection experiences degrading performance because of brownouts or other network problems. However, since the return path is determined by the IP address assigned to the corresponding outbound traffic, and since the routes for reaching this IP address have already been advertised, the return path cannot be changed to an ISP connection provided by another ISP network unless the (possibly significant!) route changes are advertised to that and/or other ISP networks. In addition, if the outbound traffic includes packets carrying data for already established Transmission Control Protocol (TCP) connections, the source (return) IP address in such packets cannot be changed because such a change would cause the termination of the TCP connections.

Although the problem of optimizing return traffic paths is presented above with respect to a customer network that uses multiple ISP connections over an IP network protocol, it is noted that this problem is not unique to ISP connections or to the IP protocol. Rather, this problem may exist for any operational context that may benefit from optimized routing and load-balancing over multiple connections that carry data over any Layer 3 or Layer 2 routable protocol.

BRIEF DESCRIPTION OF THE DRAWINGS

Optimizing return traffic paths is illustrated by way of example, and not by way of limitation, in the figures of the accompanying drawings and in which like reference numerals refer to similar elements and in which:

FIGS. 2A and 2B illustrate an example method that comprises optimizing return traffic paths according to one embodiment;

DESCRIPTION OF EXAMPLE EMBODIMENTS

Figure 1:
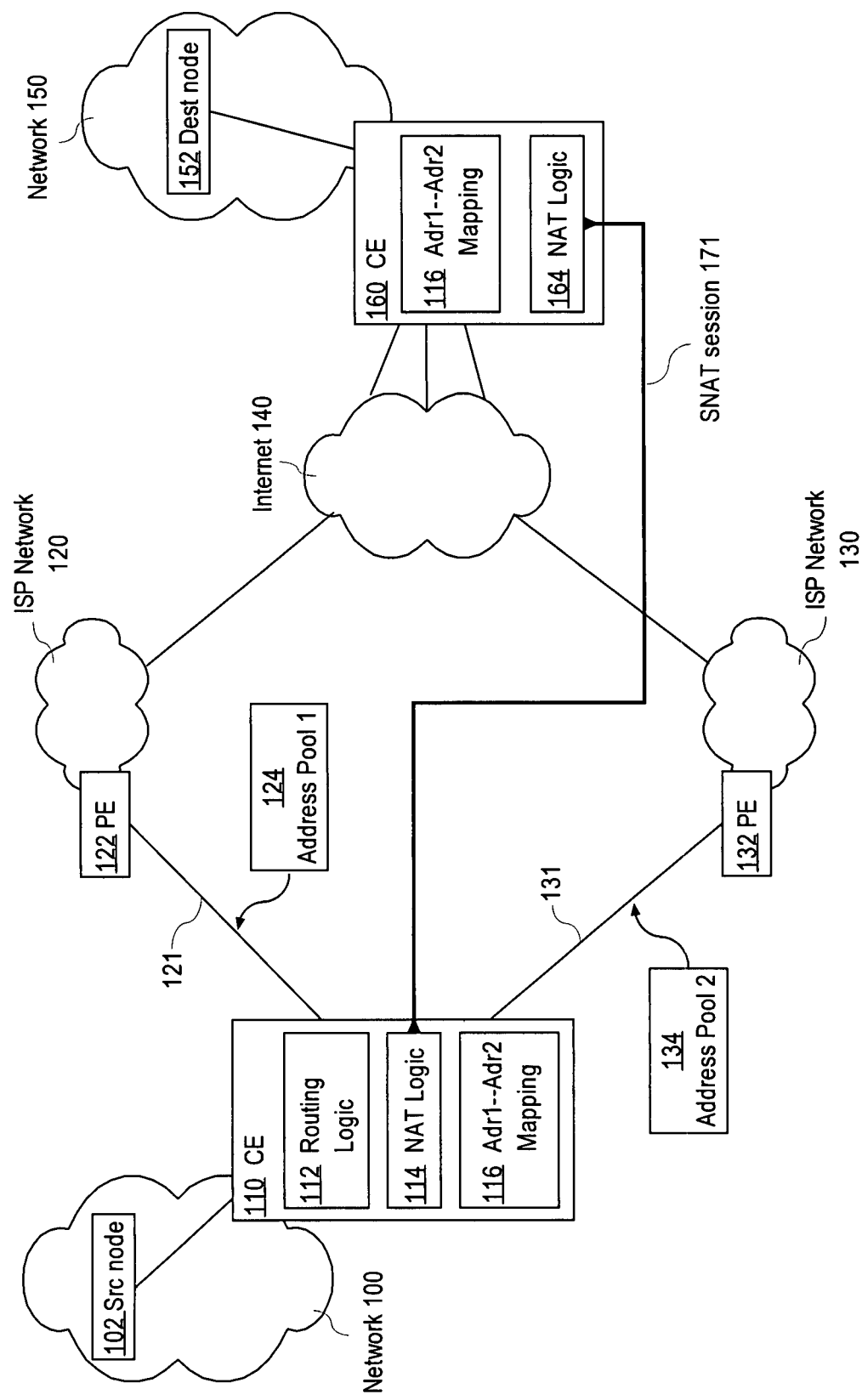
FIG. 1 illustrates an example embodiment in an example operational context.

Optimizing return traffic paths using Network Address Translation (NAT) is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview of an Example Embodiment
3.0 Optimizing Return Traffic Paths Using NAT
　3.1 Determining Optimized Return Paths
　3.2 Generating and Sending an Address Mapping
　3.3 NAT for Outbound Traffic at the Source Network Edge
　3.4 NAT for Inbound Traffic at the Destination Network Edge
　3.5 NAT for Outbound Traffic at the Destination Network Edge
　3.6 NAT for Inbound Traffic at the Source Network Edge
4.0 Additional Features and Alternative Embodiments
5.0 Implementation Mechanisms-Hardware Overview
6.0 Extensions and Alternatives 1.0 General Overview Optimizing return traffic paths using NAT is described. In an embodiment, an apparatus comprises logic encoded in one or more tangible media for execution. The logic when executed is operable to receive outbound data from a source node in a source network, and to replace a source address in a source address field in the outbound data with a first address from a first address pool associated with a first connection. When executed, the logic is also operable to determine that return traffic on the first connection needs to be switched over to a second connection, where a second address pool is associated with the second connection. In response to determining that return traffic needs to be received on the second connection, the logic is operable to generate a mapping that associates the first address with a second address from the second address pool. The logic is operable to replace the first address in the source address field in the outbound data with the second address based on the mapping, and to send the outbound data to the destination node over the second connection instead of the first connection.

In this embodiment, the logic may be operable to send the mapping to a destination logic which is operable to perform NAT for a destination node. When executed, the logic may also be operable to receive inbound data from the destination node on the second connection, where the second address is included in a destination address field of the inbound data. Based on the mapping, the logic may be operable to replace the second address in the destination address field in the inbound data with the first address. Then, the logic may be operable to replace the first address in the destination address field in the inbound data with the source address, and to send the inbound data to the source node.

In an embodiment, an apparatus comprises logic encoded in one or more tangible media for execution. The logic when executed is operable to perform network address translation for ingress traffic sent to nodes in a destination network. When executed, the logic is operable to receive a mapping that associates a first address with a second address, where the first address is assigned by a first provider network to a source network, and the second address is assigned by a second provider network to the source network. The logic is operable to receive inbound data sent from a source node in the source network to a destination node in the destination network, where the inbound data includes the second address in a source address field of the inbound data. The logic is operable to replace the second address in the source address field in the inbound data with the first address based on the mapping, and to send the inbound data to the destination node. When the logic receives from the destination node outbound data that includes the first address in a destination address field in the outbound data, the logic is operable to replace the first address in the destination address field with the second address based on the mapping, and to send the outbound data to the second address.

In an embodiment, a system comprises a first router and a second router, where the first router is operable to provide connectivity for a source network to first and second provider networks and the second router is operable to provide connectivity for a destination network. The first router comprises first logic encoded in one or more tangible media for execution. The first logic, when executed is operable to: establish a Stateful NAT (SNAT) protocol session to second logic which is included in the second router and which is operable to perform network address translation for ingress traffic sent to nodes in the destination network; receive first data from a source node in the source network; replace a source address in a source address field in the first data with a first address from a first address pool associated with a first connection that communicatively connects the source network to the first provider network; determine that return traffic on the first connection needs to be switched over to a second connection, where a second address pool is associated with the second connection and the second connection communicatively connects the source network with the second provider network; generate a mapping that associates the first address with a second address from the second address pool; send the mapping to the second logic included in the second router over the SNAT protocol session; based on the mapping, replace the first address in the source address field in the first data with the second address; and send the first data over the second connection to a destination node in the destination network. The second router comprises the second logic encoded in one or more tangible media for execution. The second logic when executed is operable to: receive the mapping from the first logic included in the first router; receive the first data; based on the mapping, replace the second address in the source address field in the first data with the first address; and send the first data to the destination node.

Other embodiments comprise one or more computer-readable media encoded with logic for optimizing return traffic paths using NAT as described herein.

In some embodiments, the described techniques for optimizing return traffic paths may be implemented using one or more computer programs executing on a network infrastructure element, such as a switch or a router, that is established in a packet-switched network. In some embodiments, the techniques described herein may be implemented by a computer system that is operatively and/or communicatively coupled to a network infrastructure element, such as a router or a switch. Thus, the embodiments described herein are to be regarded in an illustrative rather than a restrictive sense.

2.0 Structural and Functional Overview of an Example Embodiment

The techniques described herein for certain embodiments provide for optimizing return traffic paths over multiple connections by transparently translating the source address in the outbound traffic from a network address associated with one connection to a network address associated with another of the multiple connections.

FIG. 1 illustrates an example embodiment in an example operational context. Network 100 is a customer network that is communicatively connected to Internet 140 and/or to other networks through provider networks 120 and 130. For example, nodes in network 100 may communicate with nodes in network 150 by sending data over provider network 120 or 130 and over Internet 140. In some network deployments, provider networks 120 and 130 may be managed and operated by the same ISP provider. In other network deployments, provider networks 120 and 130 may be managed and operated by two separate and different network providers. The techniques for optimizing return traffic paths described herein do not depend on the ISP provider or providers that operate networks 120 and 130 so long as networks 120 and 130 are associated with separate sets of globally reachable IP addresses.

According to the techniques described herein, customer edge (CE) router 110 is configured at the edge of network 100 and is operable to function as a gateway for network traffic sent from nodes in network 100 to other networks and for network traffic received from other networks for the nodes in network 100. Similarly, CE router 160 is configured at the edge of network 150 and is operable to function as a gateway for network traffic sent from nodes in network 150 to other networks and for network traffic received from other networks for the nodes in network 150. As used herein, "node" refers to any network infrastructure element, end station, host, computer system, or other apparatus that is communicatively connected in a network and that comprises hardware components and/or software components operable to provide one or more functionalities.

In the operational context of FIG. 1, CE router 110 is configured as a multi-homed network infrastructure element operable to function as a gateway for traffic send to and from network 100. CE router 110 is assigned one or more IP addresses that are local for network 100. CE router 110 is also assigned a plurality of different IP addresses through which CE router 110 may be reached from each of provider networks 120 and 130 over network connections 121 and 131, respectively. As used herein, "connection" refers to a logical and/or physical link over which a node in one network may communicate according to a particular protocol with one or more nodes in the same or a different network.

For example, the operational context of FIG. 1 illustrates packet-switched IP networks in which the connections between network infrastructure elements in the networks are logical links identified by IP addresses. In this example operational context, CE router 110 may be assigned one or more IP addresses in address pool 124, where provider edge (PE) router 122 in provider network 120 is operable to forward IP packets to each IP address in this address pool. Thus, CE router 110 and PE router 122 are communicatively connected over network connection 121, and network connection 121 is associated with each IP address in address pool 124. Similarly, CE router 110 may be assigned one or more IP addresses in address pool 134, where PE router 132 in provider network 130 is operable to forward IP packets to each IP address in this address pool. Thus, CE router 110 and PE router 132 are communicatively connected over network connection 131, and network connection 131 is associated with each IP address in address pool 134.

CE router 110 comprises routing logic 112 and NAT logic 114. CE router 110 may further comprise other components that are not shown in FIG. 1 such as, for example, an Operating System (OS), a plurality of network interfaces, and one or more forwarding logic components that are operable to facilitate a forwarding functionality on the plurality of interfaces. Depending on the architecture of CE router 110, in some embodiments routing-logic 112 and NAT logic 114 may be implemented as one or more software and/or hardware components that may operate under the control of an OS of the router. In other embodiments, routing logic 112 and NAT logic 114 may be implemented on a blade that is operatively coupled to the backplane of CE router 110. In various embodiments, routing logic 112 and NAT logic 114 may be implemented as one or more software components that are executable by one or more processors, as one or more hardware components such as Application-Specific Integrated Circuits (ASICs), or as any combination of software and hardware components.

Routing logic 112 is operable to make routing decisions for traffic entering network 100. According to the techniques described herein, routing logic 112 is operable to optimize routing for inbound traffic that is received from provider networks 120 and 130. In addition, in some embodiments routing logic 112 may also be operable to optimize routing for outbound traffic that is sent from network 100 to provider networks 120 and 130.

NAT logic 114 is operable to perform network address translation for traffic entering and exiting network 100. For example, NAT logic 114 is operable to translate the source address in the source address field in outbound IP packets from the local IP address of the sending node in network 100 to an IP address from address pool 124 (if the outbound packets are sent to provider network 120) or to an IP address from address pool 134 (if the outbound packets are sent to provider network 130). For inbound IP packets, according to the techniques described herein NAT logic 114 is operable to: translate the destination address in a destination address field in the packets from one of an IP address in address pool 124 and an IP address in address pool 134 to the other of an IP address in address pool 124 and an IP address in address pool 134; and to translate the resulting destination address to the local IP address of the node in network 100 to which the packets are sent.

In operation, suppose that source node 102 in network 100 has established a TCP connection to destination node 152 in network 150. Suppose that source node 102 has the local IP address "S" in network 100, and destination node 152 has the local IP address "D" in network 150. Suppose also that CE router 160, which is operable as a gateway and provides connectivity for the nodes in network 150, is assigned the globally reachable IP address of "Y". (It is noted that the designations "S", "D", and "Y" are used herein for illustration purposes only. The actual local IP addresses of source node 102 and destination node 152 may be any valid IP addresses, such as, for example, "192.168.10.23" and "192.168.91.16", respectively. The actual globally reachable IP address of CE router 160 may be, for example, "66.7.224.15".)

In normal operation, a TCP/IP client in source node 102 generates IP packets that include segments of the TCP connection established between source node 102 and destination node 152. The IP packets are then routed over network 100 to CE router 110. When the IP packets are received at CE router 110, the source and destination address fields in the packets are as follows:

src-ip: S; dest-ip: Y.

The destination address field in the IP packets is "Y" because the destination node 152 is behind the NAT logic 164 in CE router 160, which provides network address translation for nodes in network 150.

Routing logic 112 determines or has previously determined that IP packets sent to network 150 are to be forwarded over connection 121 to network 120. Upon receipt of the IP packets from source node 102, NAT logic 114 translates the source address in the IP packets to the globally reachable IP address "X1", which is selected from address pool 124. (It is noted that the designation "X1" is used herein for illustration purposes only; the actual globally reachable IP address assigned to CE router 110 from address pool 124 may be, for example, "10.108.13.73".) Thus, when the IP packets received from source node 102 are sent out from CE router 110, the source and destination address fields in the packets are as follows:

src-ip: X1; dest-ip: Y.

After NAT logic 114 has translated the source address in the IP packets to "X1", the packets are sent over connection 121 to network 120 and are subsequently forwarded over to Internet 140 and from there to CE router 160. When the IP packets are received at CE router 160, NAT logic 164 examines the packets and replaces the destination address in the packets with the IP address "D" of destination node 152. Thereafter, CE router 160 forwards the packets over network 150 to destination node 152. Thus, upon exit from CE router 160 and upon receipt at destination node 152, the source and destination address fields in the packets are as follows:

src-ip: X1; dest-ip: D.

Since CE router 110 has translated the source address of the IP packets to "X1", any return IP packets from destination node 152 to source node 102 are going to be received at CE router 110 over connection 121 from provider network 120. For example, a TCP/IP client in destination node 152 generates return IP packets that include segments of the TCP connection established between source node 102 and destination node 152. The return IP packets are then routed over network 150 to CE router 160. When the return IP packets are received at CE router 160, the source and destination address fields in the packets are as follows:

src-ip: D; dest-ip: X1.

NAT logic 164 translates the source address in the return IP packets to the globally reachable IP address "Y" of CE router 160. When the return IP packets are sent from CE router 160, the source and destination address fields in the packets are as follows:

src-ip: Y; dest-ip: X1.

CE router 160 then forwards the packets to the destination address "X1" over Internet 140. Since the destination address of the return IP packets is "X1", the return IP packets are routed over network 120 and connection 121 to CE router 110. When the return IP packets are received at CE router 110, NAT logic 114 translates the destination address in the packets to the local IP address "S" of source node 102 and the packets are forwarded over network 100 to source node 102. Thus, when the return IP packets are send from CE router 110, the source and destination address fields in the packets are as follows:

src-ip: Y; dest-ip: S.

In this manner, in a normal operation segments of the TCP connection between source node 102 and destination node 152 are exchanged in IP packets through CE router 110 and over connection 121.

Suppose now that at some point during the life of the TCP connection, routing logic 112 in CE router 110 determines that network traffic between network 100 and network 152 needs to be switched over to connection 131 through provider network 130. For example, routing logic 112 may monitor one or more performance metrics, and may determine that connection 121 is experiencing a degrading performance. In another example, routing logic 112 may determine that inbound traffic sent from network 152 (or from another network) needs to be load-balanced over connection 131 because connection 131 may be having a lot of spare bandwidth. In another example, routing logic 112 may monitor various performance metrics and may determine that provider network 120 is experiencing network problems that cause degrading performance for traffic that is passing through that network. In another example, routing logic 112 may perform other routing optimizations which may indicate that incoming traffic should be switched over from connection 121 to connection 131.

According to the techniques for optimizing return traffic paths described herein, when routing logic 112 in CE router 110 determines that the return path for incoming traffic needs to be switched over to connection 131, routing logic 112 informs or otherwise causes NAT logic 114 to generate mapping 116 that maps the IP address "X1" of address pool 124 to IP address "X2" in address pool 134 that is associated with connection 131. (It is noted that the designation "X2" is used herein for illustration purposes only; the actual globally reachable IP address assigned to CE router 110 by provider network 130 may be, for example, "33.0.12.48".) As used herein, "mapping" refers to a data structure that stores information indicating one or more associations between two or more addresses. For example, mapping 116 may be as follows:

X1→X2

Thus, with respect to outbound IP packets that include segments of the TCP connection between source node 102 and destination node 152, NAT logic 114 would be operable to perform the following address translations for the source address in the packets:

S→X1
X1→X2

After NAT logic 114 generates mapping 116, NAT logic 114 sends mapping 116 to NAT logic 164 in CE router 160. In the embodiment illustrated in FIG. 1, NAT logic 114 in CE router 110 has established Stateful NAT (SNAT) session 171 with NAT logic 164 in CE router 160. NAT logic 114 may send mapping 116 to NAT logic 164 in a SNAT ADD message that is sent over SNAT session 171.

SNAT is a protocol developed by Cisco Systems, Inc. of San Jose, Calif., that allows two or more NAT services to function as a translation group. According to SNAT, each member of the translation group exchanges NAT table updates with the other members of the group, which allows each member to be aware of the NAT table entries in the other members of the group. The routers on which the members of the SNAT translation group execute establish TCP connections between each other, and the members of the translation group use these TCP connections to exchange their NAT tables and any updates thereto. A description of SNAT is provided in a white paper titled "*Enhanced IP Resiliency Using Cisco Stateful Network Address Translation*", Cisco Systems, Inc. 2002, , the entire contents of which is hereby incorporated by reference for all purposes as if fully set forth herein. SNAT is also described in U.S. Pat. No. 7,042,876 entitled "*Stateful Network Address Translation Protocol Implemented Over a Data Network*", issued to Siva S. Jayasenan et al. on May 9, 2006 and assigned to Cisco Technology, Inc., the entire contents of which is hereby incorporated by reference for all purposes as if fully set forth herein.

In the embodiment illustrated in FIG. 1, CE router 110 buffers any IP packets received from source node 102 until NAT logic 164 in CE router 160 acknowledges receipt of mapping 116. When NAT logic 164 acknowledges receipt of mapping 116, NAT logic 114 first translates the source address in the buffered IP packets and in any IP packets subsequently received from source node 102 to the globally reachable IP address "X1", which is associated with connection 121. Thereafter, based on mapping 116, NAT logic 114 translates the source address "X1" to the globally reachable IP address "X2", which is selected from address pool 134 and is associated with connection 131. Thus, when the IP packets received from source node 102 are sent out from CE router 110, the source and destination address fields in the packets are as follows:

src-ip: X2; dest-ip: Y.

After NAT logic 114 has translated the source address in the IP packets to "X2", the packets are sent over connection 131 to network 130 and are subsequently forwarded over to Internet 140 and to CE router 160. When the IP packets are received at CE router 160, NAT logic 164 examines the packets and replaces the destination address in the packets with the IP address "D" of destination node 152. In addition, based on mapping 116, NAT logic 164 replaces the source address in the packets with the IP address "X1". Thereafter, CE router 160 forwards the packets over network 150 to destination node 152. Thus, upon exit from CE router 160 and upon receipt at destination node 152, the source and destination address fields in the packets are as follows:

src-ip: X1; dest-ip: D.

In this manner, the IP packets received at destination node 152 from source node 102 include the same source and destination addresses ("X1" and "D", respectively) as before even though the packets were sent by CE router 110 over connection 131 and not over connection 121. Further, since NAT logic 164 is aware of mapping 116, any return packets from destination node 152 to source node 102 are going to be sent from CE router 160 to IP address "X2" and therefore are going to be received at CE router 110 over connection 131 from provider network 130. For example, a TCP/IP client in destination node 152 generates return IP packets that include segments of the TCP connection established between source node 102 and destination node 152. The return IP packets are then forwarded over network 150 to CE router 160. When the return IP packets are received at CE router 160, the source and destination address fields in the packets are as follows:

src-ip: D; dest-ip: X1.

NAT logic 164 translates the source address in the return IP packets to the globally reachable IP address "Y" of CE router 160. In addition, based on mapping 116, NAT logic 164 replaces the destination address in the packets with the IP address "X2". When the return IP packets are sent from CE router 160, the source and destination address fields in the packets are as follows:

src-ip: Y; dest-ip: X2.

CE router 160 then forwards the packets to the destination address "X2" over Internet 140. Since the destination address of the return IP packets is "X2", the return IP packets are routed over network 130 and connection 131 to CE router 110. When the return IP packets are received at CE router 110, NAT logic 114 first translates the destination address in the packets from IP address "X2" to IP address "X1" based on mapping 116. Then, NAT logic 114 translates the destination address in the packets from IP address "X1" to the local IP address "S" of source node 102. CE router 110 then forwards the packets over network 100 to source node 102. Thus, when the return IP packets are send from CE router 110 to source node 102, the source and destination address fields in the packets are as follows:

src-ip: Y; dest-ip: S.

In this manner, the return IP packets received at source node 102 from destination node 152 include the same source and destination addresses ("Y" and "S", respectively) as before even though the packets were received at CE router 110 over connection 131 and not over connection 121.

When routing logic 112 in CE router 110 determines that return IP traffic needs to be switched from connection 131 to connection 121, routing logic 112 informs or otherwise causes NAT logic 114 to remove mapping 116 from its translation tables. NAT logic 114 propagates this change to NAT 164 in CE router 160, for example, by sending a SNAT DELETE message which indicates that mapping 116 needs to be removed. CE router 110 buffers any outbound IP packets until NAT 164 acknowledges that mapping 116 has been removed. Thereafter, CE router 110 and NAT logic 114 may proceed with processing and sending the buffered IP packets and any subsequent IP packets over connection 121.

The techniques for optimizing return traffic paths described above are transparent to the source and destination nodes and to any TCP connections that may have been established between them. In order to change the inbound path on which return traffic is received, the described techniques provide for changing the source address in outbound traffic in such manner that neither the source node nor the destination node participating in a TCP connection can detect the change. As a result, the TCP connection between the source and destination nodes would not be terminated by either node ven though the path on which return packets travel is effectively switched.

3.0 Optimizing Return Traffic Paths Using NAT

Figure 2B:
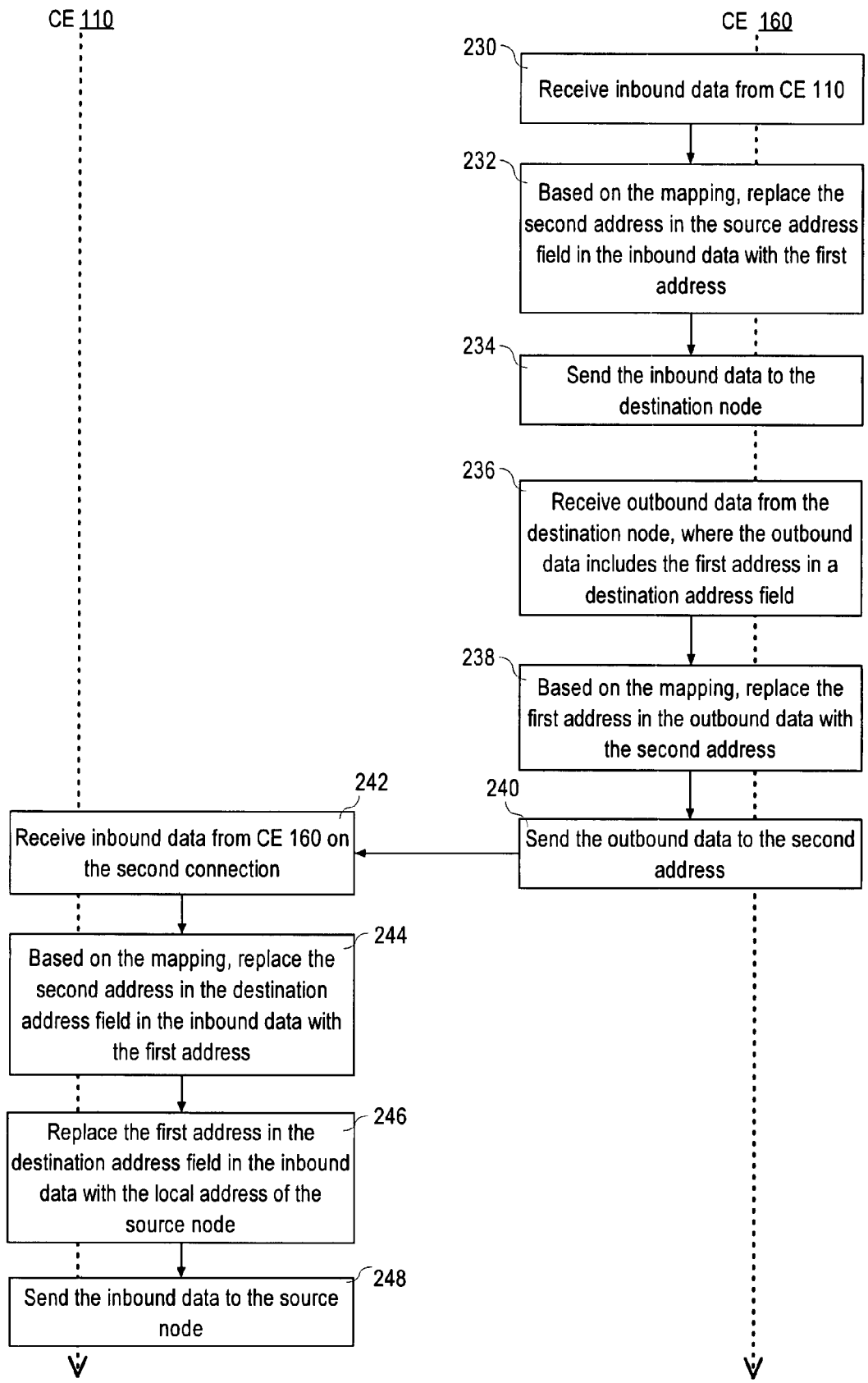

FIGS. 2A and 2B illustrate an example method that comprises optimizing return traffic paths. While the example method of FIGS. 2A and 2B is described with respect to CE routers 110 and 160 of FIG. 1, the techniques for optimizing return traffic paths described herein are not limited to being implemented by routers in packet-switched networks. Rather, the techniques for optimizing return traffic paths may be implemented at any network devices in any networks that use routable network protocols. For this reason, the example method of FIGS. 2A and 2B is to be regarded in an illustrative rather than a restrictive sense.

Referring to FIG. 2A, in steps 202 and 204 a network infrastructure element in a source network (the source network element) establishes a SNAT protocol session with a network infrastructure element in a destination network (the destination network element). The source network element is configured at the edge of the source network and is operable to function as a gateway for network traffic sent to and from nodes in the source network. The destination network element is configured at the edge of the destination network and is operable to function as a gateway for network traffic sent to and from nodes in the destination network.

For example, CE router 110 depicted in FIG. 1 may establish a SNAT session with CE router 160. In one embodiment, each of the routers may include a mechanism which causes the SNAT session to be established when the router boots up based on a specific configuration. The SNAT session is persistent and is maintained by the routers over a TCP connection. If the TCP connection fails for whatever reason, the mechanism in one or both routers would cause the SNAT session to be re-established when the TCP connection is restored.

According to the techniques for optimizing return traffic paths described herein, the source network element uses the SNAT session to send to the destination network element a mapping. The mapping is a data structure that associates a first address for a first connection to the source network with a second address for a second connection to the source network, where the second connection is the connection to which return traffic needs to be switched from the first connection. The source and destination network elements use the mapping to transparently change the source and/or destination addresses in data that is exchanged between nodes in the source and destination networks.

In normal operation, in step 206 the source network element receives outbound data from a source node in the source network, where the outbound data is destined to a particular destination node in the destination network. As used herein, "outbound data" refers to information which is structured according to some routable network protocol and which is sent from one network or node therein to one or more other networks or nodes therein. For example, in the operational context illustrated in FIG. 1, the outbound data is a flow of IP packets that is sent over packet-switched IP networks. In other examples, the outbound data may be Asynchronous Transfer Mode (ATM) cells or Frame Relay (FR) frames. The techniques for optimizing return traffic paths described herein are not limited to any particular type of outbound data, and for this reason the examples of outbound data provided herein are to be regarded in an illustrative rather than a restrictive sense.

In step 208, the local address of the sending node in a source address field in the outbound data is replaced with a first address from a first address pool that is associated with a first connection. The first connection is one of multiple connections over which the source network element may send outbound packets that originate in the source network. In addition, the first connection is determined by the source network element as the connection over which particular outbound data is normally sent out. For example, in the operational context illustrated in FIG. 1, routing logic 112 may determine that IP packets send from source node 102 to destination node 152 should be sent out by CE router 110 over connection 121.

3.1 Determining Optimized Return Paths

Referring to FIG. 2A, in step 210 the source network element (or a component thereof) determines that return traffic on the first connection needs to be switched over to a second connection. The second connection is another of the multiple connections over which the source network element can forward outbound data originating in the source network.

In different embodiments and operational contexts, there may be a variety of reasons of why return traffic needs to be switched over to the second connection. For example, the source network element may decide to load-balance the return traffic over both the first and second connections because the first connection may be experiencing a degrading performance while the second connection may be underutilized. In this example, the source network element may decide to switch over to the second connection the return traffic for some but not all of the outbound data flows that are normally sent out over the first connection. In another example, the source network element may need to switch the return traffic over the second connection because the first connection may have temporarily or permanently gone down. In this example, the source network element may switch over to the second connection the return traffic for all of the outbound data flows that are normally sent over the first connection. In another example, the source network element may determine that return traffic needs to be switched over to the second connection for reasons that are not related to the first connection itself but are related to problems existing in the network or networks that are on a network path beyond the first connection.

Thus, the reasons for which the source network element may decide to optimize the return traffic paths are not limited or related to any particular conditions, and the network conditions that may cause optimization of the return traffic paths described in this disclosure are to be regarded in an illustrative rather than a restrictive sense.

3.2 Generating and Sending an Address Mapping

In response to determining that return traffic paths need to be switched over to the second connection, in step 212 the source network element (or a component thereof) generates a mapping that associates the first address for the first connection with a second address for the second connection. For example, in the operational context of FIG. 1, NAT logic 114 in CE router 110 would generate a mapping that associates an IP address from address pool 124 with an IP address from address pool 134. In this manner, the IP address of CE router 110 which is globally reachable over connection 121 is mapped to the IP address of CE router 110 which is globally reachable over connection 131 through network 130.

In some embodiments, the mapping generated in step 212 may also include information specifying that the mapping is applicable only for a particular source network and a particular destination network. For example, the mapping may include the prefixes of the source and destination networks to which the mapping is applicable. This would mean that the return traffic for all outbound flows, which are originated by any node in the particular source network and which are destined to any node in the destination network, is to be switched over from the first connection to the second connection. In some embodiments, the mapping may include information specifying that the mapping is applicable only to return traffic for outbound data flows that are sent from a particular node in the source network to a particular node in the destination network.

Referring to FIG. 2A, in step 214 the generated mapping is sent to the destination network element. For example, in the operational context of FIG. 1, NAT logic 114 in CE router 110 may send the mapping in a SNAT ADD message to NAT logic 164 in CE router 160 over SNAT session 171.

In step 218, the destination network element or a component thereof receives the mapping, and in step 220 the destination network element sends back an acknowledgement to the source network element. In step 222, the source network element receives the acknowledgement. For example, in the operational context of FIG. 1, NAT logic 164 in CE router 160 receives the mapping over SNAT session 171, and sends back a message acknowledging to NAT logic 114 that the mapping has been received and stored in the NAT tables operated by NAT logic 164.

Concurrently with or before step 214, in step 216 the source network element may start to buffer the outbound data for which the return traffic is to be switched over to the second connection. The source network element would continue buffering the outbound data until the destination network element or the component thereof has acknowledged receipt of the mapping. In this manner, the source network element ensures that the destination network element would be able to correctly process any outbound data in which the source address is replaced based on the mapping.

3.3 NAT for Outbound Traffic at the Source Network Edge

Referring to FIG. 2A, in step 224 the source network element replaces the first address in the source address field in the outbound data with the second address. In this manner, the source address in the outbound data (which is also the return address for inbound data corresponding to the outbound data) is effectively changed from the local address of the sending source node, to the first address of the first connection, and finally to the second address which is associated with second connection. Thus, any return traffic corresponding to the outbound data is going to be received at the source network element over the second connection.

In step 226, the source network element sends the outbound data (which includes the second address of the second connection as a return address) over the second connection to the destination network element.

3.4 NAT for Inbound Traffic at the Destination Network Edge

The destination network element is operable to function as a gateway for traffic sent to and from nodes in the destination network, and is also operable to perform network address translation on such traffic. According to the techniques for optimizing return traffic paths described herein, the destination network element is also operable to perform additional address translation that is based on a mapping received from a source network element.

Referring now to FIG. 2B, in step 230 the destination network element receives inbound data, which inbound data is the outbound data that is sent from the source network element. As used herein, "inbound data" refers to information which is structured according to some routable network protocol and which is received at a network element. Typically, the outbound data sent from one network element would be inbound data for another network element that receives it.

When the inbound data is received at the destination network element, a source address field in the inbound data stores the second address for the second connection to the source network. This is because before sending the data out, the source network element has replaced the first address in the source address field with the second address in order to switch any return traffic to the second connection. For this reason, in step 232 the destination network element or a component thereof replaces the second address in the inbound data with the first address based on the mapping previously received from the source network element.

For example, in the operational context of FIG. 1, when CE router 160 receives inbound IP packets sent from CE router 110, NAT logic 164 would normally perform an address translation for the destination address field in such packets. According to the techniques described herein, NAT logic 164 may also inspect its NAT tables to determine whether any additional address translation needs to be performed for the source address field in the received IP packets. During such inspection, NAT logic 164 would locate mapping 116, and based on the mapping would translate the source address in the received IP packets from the IP address associated with connection 131 to the IP address associated with connection 121.

After the second address in the source address field in the inbound data is replaced with the first address based on the mapping, in step 234 the destination network element forwards the inbound data over the destination network to the destination node to which the data is sent. The destination node would not be able to detect any unusual addresses in the inbound data because the destination network element has properly translated the source address in the inbound data to the first address, which first address is the source address expected by the destination node.

3.5 NAT for Outbound Traffic at the Destination Network Edge

Before, after, or concurrently with receiving the inbound data, the destination node in the destination network may send return data to the source node in the source network. The return data corresponds to or is otherwise associated with the inbound data. For example, the return data and the inbound data may be IP packets encapsulating the segments of a TCP connection established between the source node and the destination node. The destination node would typically send the return data over the destination network to the gateway destination network element.

Referring to FIG. 2B, in step 236 the destination network element receives the return data and determines that it is outbound data that includes, in a destination address field, the first address of the first connection to the source network. In addition to performing any address translation that may be necessary for the source address included in the outbound data, the destination network element or a component thereof determines based on the mapping that additional address translation needs to be performed for the destination address included in the outbound data.

Based on the mapping, in step 238 the destination network element or a component thereof replaces the first address in the destination address field of the outbound data with the second address that is associated with the second connection to the source network.

Since the destination address for the outbound data is now the second address of the second connection, in step 240 the destination network element sends out the outbound data to the second address. Thereafter, the outbound data is eventually routed to the source network element through the second connection, which effectively results in switching the return path to the source network from the first connection over to the second connection.

3.6 NAT for Inbound Traffic at the Source Network Edge

In step 242, the source network element receives as inbound data the return data sent to the second address from the destination network element. Since the destination address in the inbound data has been changed by the destination network element based on the mapping to the second address, the source network element receives this inbound data over the second connection.

The source network element or a component thereof then determines that the destination address in the inbound data needs to be replaced based on the mapping. For example, in the operational context of FIG. 1, NAT logic 114 in CE router 110 may inspect its NAT tables and may determine that mapping 116 indicates that an IP address from address pool 134 (e.g. the second address) needs to be replaced as a destination address with an IP address from address pool 124 (e.g. the first address).

Based on the mapping, in step 244 the source network element or a component thereof replaces the second address in the destination address field in the inbound data with the first address. Thereafter, in step 246 the source network element performs the normal address translation for the destination address in the inbound data by replacing the first address in the destination address field with the local address of the source node to which the inbound data is destined.

Thereafter, in step 248 the source network element forwards the inbound data over the source network to the source node to which the data is sent. The source node would not be able to detect any unusual addresses in the inbound data because the source network element has properly translated the destination address in the inbound data from the second address to the first address to the local address of the source node, which local address is the destination address expected by the source node.

4.0 Additional Features and Alternative Embodiments

Figure 3:
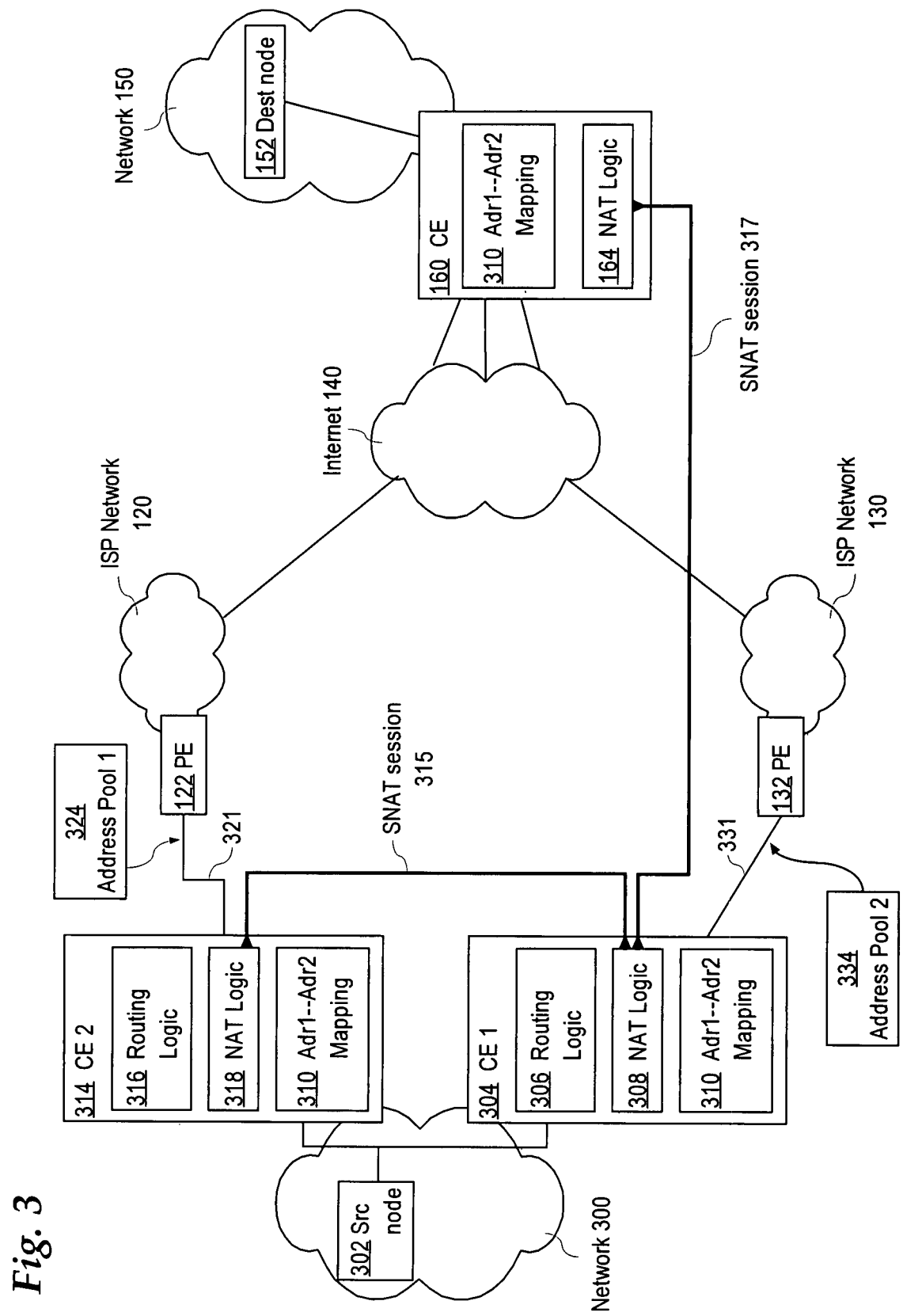
FIG. 3 illustrates another example embodiment.

FIG. 3 illustrates an example embodiment in which multiple CE routers provide connectivity for a customer network over multiple connections. CE routers 304 and 314 are configured at the edges of network 300 and are each operable to function as gateways for network traffic sent to and from nodes network 100. Similarly to the operational context illustrated in FIG. 1, CE router 160 is configured at the edge of network 150 and is operable to function as a gateway for network traffic sent to and from nodes in network 150.

Referring to FIG. 3, CE routers 304 and 314 are both assigned one or more IP addresses that are local for network 100. CE router 314 is also assigned one or more IP addresses through which the router may be reached from provider network 120 over network connection 321. The one or more IP addresses assigned to CE router 314 may be addresses from address pool 324, where PE router 122 in provider network 120 is operable to forward IP packets to each IP address in this address pool. Similarly, CE router 304 is assigned one or more IP addresses through which the router may be reached from provider network 130 over network connection 331. The one or more IP addresses assigned to CE router 304 may be addresses from address pool 334, where PE router 132 in provider network 130 is operable to forward IP packets to each IP address in this address pool.

CE router 314 comprises routing logic 316 and NAT logic 318, and CE router 304 comprises routing logic 306 and NAT logic 308. NAT logic 318 and NAT logic 308 maintain SNAT session 315 over one or more TCP connections established between CE routers 314 and 304 over network 300. NAT logic 308 also maintains SNAT session 317 to NAT logic 164 in CE router 160.

According to the technique for optimizing return traffic paths described herein, NAT logic 314 is operable to exchange with NAT logic 308 any mappings that associate IP addresses from address pools 324 and 334 for the purpose of switching return traffic from connection 321 to connection 331. When NAT logic 308 receives any such mapping, NAT logic 308 is operable to send the mapping to NAT logic 164 in CE router 160.

According to the techniques described herein, CE router 314 may switch return traffic paths to CE router 304 in the following manner. Suppose that initially outbound IP packets sent from source node 302 to destination node 152 are routed through CE router 314 and over connection 321. When routing logic 316 determines that the IP packets returned from destination node 152 need to be switched to connection 331, routing logic 316 informs or otherwise causes NAT logic 318 to generate mapping 310 that maps an IP address from address pool 324 to an IP address from address pool 334 that is associated with connection 331. NAT logic 318 then sends mapping 310 over SNAT session 315 to NAT logic 308 in CE router 304. NAT logic 308 in turn sends mapping 310 to NAT logic 164 in CE router 160.

Thereafter, based at least on mapping 310, NAT logic 318 translates the source address in any buffered and/or newly received IP packets from source node 302. For example, NAT logic 318 translates the local IP address of source node 302 in the IP packets to an IP address from address pool 324, and then based on mapping 310 translates this IP address to an IP address from address pool 334. CE router 314 or a component thereof forwards the IP packets to CE router 304, which in turn sends the packets on connection 331 to provider network 130. In this manner, when the IP packets leave CE router 304, the source address field in the packets is the IP address from address pool 324 that is associated with connection 331. Thus, any return IP packets received from CE router 160 would be sent to network 300 over connection 331 and through CE router 304.

When CE router 304 receives return IP packets in which the destination address is the IP address associated with connection 331, NAT logic 308 translates this destination address based on mapping 310 to the IP address from address pool 324 that is associated with connection 321. Thereafter, NAT logic 308 may translate the IP address associated with connection 321 to the local IP address of source node 302, and may forward the return IP packets over network 300 to the source node. Alternatively, after translating the destination address in the return IP packets to the IP address associated with connection 321, CE router 304 may forward the packets to CE router 314, where NAT logic 318 would translate the source address in the packets to the local IP address of source node 302 and would cause the packets to be forwarded to the source node. In this manner, the techniques for optimizing return traffic paths may be implemented in an operational context in which multiple CE routers provide connectivity for a customer network over multiple connections.

The techniques described herein for optimizing return traffic paths using NAT are not limited to being implemented in any particular type of network infrastructure element. For example, in some embodiments the techniques described herein may be implemented as OS components that are operable to execute in a network infrastructure element that is a switch or a router. In other embodiments, the techniques described herein may be implemented as components of an OS that is operable to execute on a blade that is operatively coupled to the backplane of a network infrastructure element such as a switch or a router.

In some embodiments, the techniques for optimizing return traffic paths described herein may involve translation between more than two addresses that are associated with more than two connections. For example, the techniques described herein may provide for address translation based on a mapping that maps address "X1" to address "X2", and then maps address "X2" to address "X3", where each of addresses "X1", "X2", and "X3" is associated with a different inbound connection. In this example, the following address translations may be performed for the source address in outbound data:

S→X1
X1→X2
X2→X3 where "S" is the local address of the source node that sent the outbound data. This embodiment may be applicable in situations where the return traffic for the same outbound data flow needs to be switched twice in succession over two separate connections.

The techniques for optimizing return traffic paths described herein are not limited to being implemented with respect to any particular type of outbound data. For example, in some embodiments the techniques described herein may be used to optimize the return traffic for outbound data configured for carrying information associated with a connection-oriented transport protocol such as TCP. In other embodiments, the techniques described herein may be used to optimize the return traffic for outbound data configured for carrying information associated with a connectionless transport protocol such as User Datagram Protocol (UDP). In other embodiments, the techniques described herein may be used to optimize the return traffic for outbound data configured for carrying information associated with an application level protocol such as HyperText Transfer Protocol (HTTP). In some embodiments, the techniques described herein may be implemented for outbound data (and return data) that is configured according to any Layer 3 or Layer 2 routable protocol.

The techniques for optimizing return traffic paths using NAT are described herein with reference to numerous details, examples, and embodiments, which are to be regarded in an illustrative rather than a restrictive sense.

5.0 Implementation Mechanisms—Hardware Overview

Figure 4:
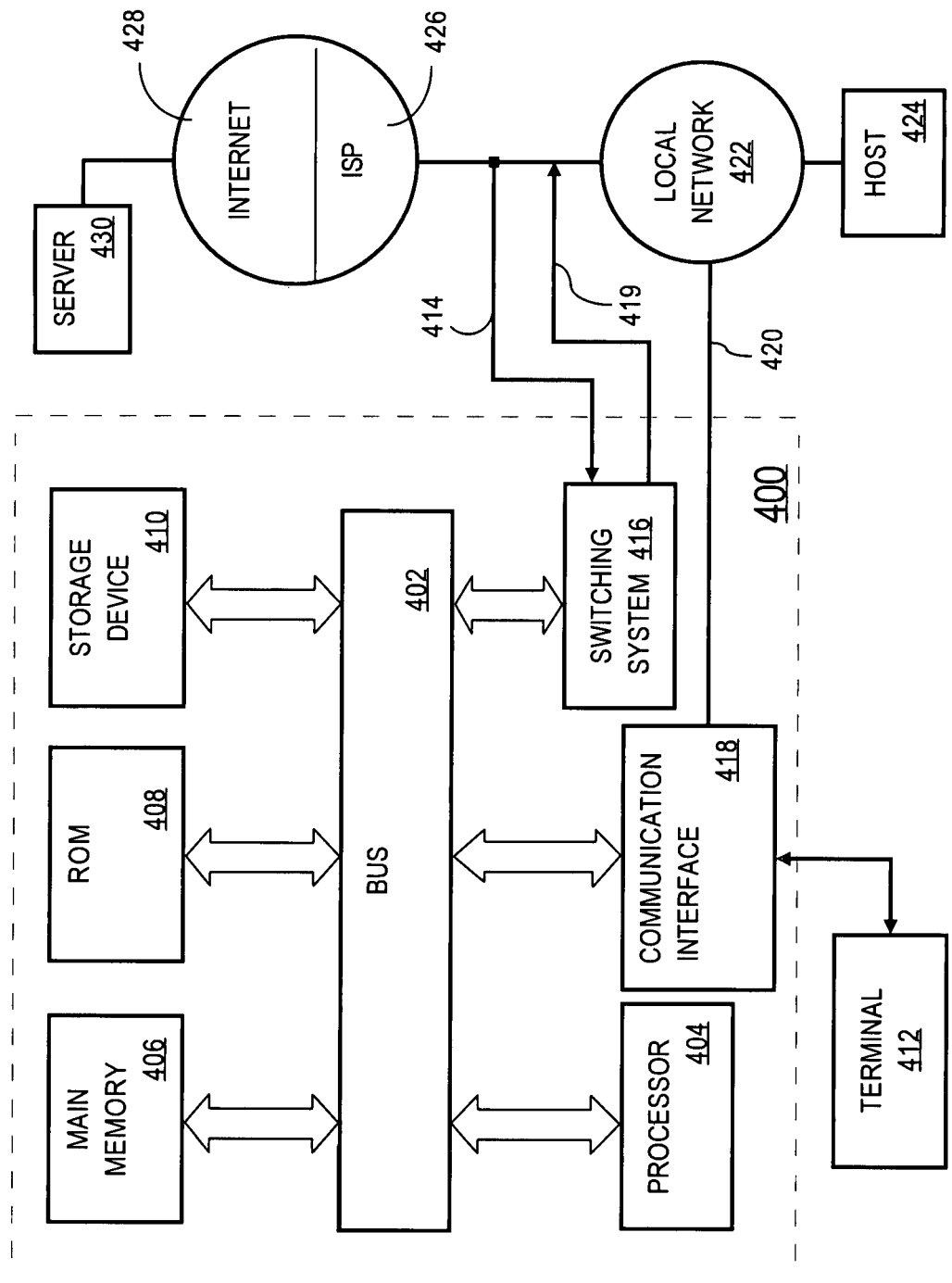
FIG. 4 illustrates a computer system.

FIG. 4 is a block diagram that illustrates a computer system 400 upon which an embodiment of the techniques described herein may be implemented. Example embodiments may be implemented using one or more computer programs and/or one or more ASICs executing on a network infrastructure element such as a router or a switch. Thus, in one embodiment the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for optimizing return traffic paths. According to one embodiment, optimizing return traffic paths is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for optimizing return traffic paths as described herein.

The received code may be executed by processor 404 as it is received, and/or stored in storage device 410, or other non-volatile storage for later execution. In this manner, computer system 400 may obtain application code in the form of a carrier wave.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus comprising:
one or more processors;
logic encoded in one or more tangible media for execution and, when executed by the one or more processors, operable to:
receive outbound data from a source node in a source network;
replace a source address in a source address field in the outbound data with a first address from a first address pool associated with a first connection;
determine that return traffic on the first connection needs to be switched over to a second connection, wherein a second address pool is associated with the second connection;
generate a mapping that associates the first address with a second address from the second address pool;
based on the mapping, replace the first address in the source address field in the outbound data with the second address; and
send the outbound data to the destination node over the second connection.

2. The apparatus of claim 1, wherein the logic further comprises logic which when executed is operable to:
send the mapping to a destination logic that is operable to perform network address translation for a destination node;
receive, on the second connection, inbound data from the destination node, wherein the second address is included in a destination address field in the inbound data;
based on the mapping, replace the second address in the destination address field in the inbound data with the first address;
replace the first address in the destination address field in the inbound data with the source address; and
send the inbound data to the source node.

3. The apparatus of claim 2, wherein:
each of the outbound data and the inbound data comprise one or more segments associated with a Transmission Control Protocol (TCP) connection established between the source node and the destination node;
the source address is a local Internet Protocol (IP) address of the source node in the source network; and
the first address pool is a first pool of IP addresses assigned by a first provider network to the source network, and the second address pool is a second pool of IP addresses assigned by a second provider network to the source network.

4. The apparatus of claim 3, wherein the logic is operable to replace the first address in the outbound data with the second address and to replace the second address in the inbound data with the first address without causing termination of the TCP connection between the source node and the destination node.

5. The apparatus of claim 2, wherein the logic further comprises logic which when executed is operable to:
receive an acknowledgement that the destination logic has received the mapping; and
buffer the outbound data until the acknowledgement has been received.

6. The apparatus of claim 2, wherein the logic is operable to send the mapping to the destination logic over a Stateful NAT (SNAT) protocol session.

7. The apparatus of claim 1, wherein:
the first connection communicatively connects the source network to a first provider network; and
the second connection communicatively connects the source network to a second provider network.

8. The apparatus of claim 7, wherein the logic is included in one or more network infrastructure elements that are established at one or more edges of the source network to provide the source network with connectivity to the first and the second provider networks.

9. A system comprising:
a first router operable to provide connectivity for a source network to a first provider network and a second provider network, the first router comprising first logic encoded in first one or more tangible media for execution and when executed operable to:
establish a Stateful NAT (SNAT) protocol session to second logic that is operable to perform network address translation for ingress traffic sent to nodes in a destination network;
receive first data from a source node in the source network;
replace a source address in a source address field in the first data with a first address from a first address pool associated with a first connection that communicatively connects the source network to the first provider network;
determine that return traffic on the first connection needs to be switched over to a second connection, wherein a second address pool is associated with the second connection and the second connection communicatively connects the source network with the second provider network;
generate a mapping that associates the first address with a second address from the second address pool;
send the mapping to the second logic over the SNAT protocol session;
based on the mapping, replace the first address in the source address field in the first data with the second address; and
send the first data over the second connection to a destination node in the destination network; and
a second router operable to provide connectivity for the destination network, the second router comprising the second logic encoded in second one or more tangible media for execution and when executed operable to:
receive the mapping from the first logic;
receive the first data;
based on the mapping, replace the second address in the source address field in the first data with the first address; and
send the first data to the destination node.

10. The system of claim 9, wherein:
the second logic included in the second router further comprises logic which when executed is operable to:
receive second data from the destination node, wherein the second data includes the first address in a destination address field in the second data;
based on the mapping, replace the first address in the destination address field in the second data with the second address; and
send the second data to the second address; and
the first logic included in the first router further comprises logic which when executed is operable to:
receive the second data on the second connection;
based on the mapping, replace the second address in the destination address field in the second data with the first address;
replace the first address in the destination address field in the second data with the source address; and
send the second data to the source node.

11. An apparatus comprising:
means for receiving outbound data from a source node in a source network;
means for replacing a source address in a source address field in the outbound data with a first address from a first address pool associated with a first connection;
means for determining that return traffic on the first connection needs to be switched over to a second connection, wherein a second address pool is associated with the second connection;
means for generating a mapping that associates the first address with a second address from the second address pool;
means for replacing, based on the mapping, the first address in the source address field in the outbound data with the second address; and
means for sending the outbound data to the destination node over the second connection.

12. The apparatus of claim 11, further comprising:
means for sending the mapping to a destination logic that is operable to perform network address translation for a destination node;
means for receiving, on the second connection, inbound data from the destination node, wherein the second address is included in a destination address field in the inbound data;
means for replacing, based on the mapping, the second address in the destination address field in the inbound data with the first address;
means for replacing the first address in the destination address field in the inbound data with the source address; and
means for sending the inbound data to the source node.

13. The apparatus of claim 12, wherein:
each of the outbound data and the inbound data comprise one or more segments associated with a Transmission Control Protocol (TCP) connection established between the source node and the destination node;
the source address is a local Internet Protocol (IP) address of the source node in the source network; and
the first address pool is a first pool of IP addresses assigned by a first provider network to the source network, and the second address pool is a second pool of IP addresses assigned by a second provider network to the source network.

14. The apparatus of claim 13, wherein the means for replacing the first address in the outbound data with the second address and the means for replacing the second address in the inbound data with the first address are operable to perform address replacement without causing termination of the TCP connection between the source node and the destination node.

15. The apparatus of claim 12, further comprising:
means for receiving an acknowledgement that the destination logic has received the mapping; and
means for buffering the outbound data until the acknowledgement has been received.

16. The apparatus of claim 12, wherein the means for sending the mapping is operable to send the mapping to the destination logic over a Stateful NAT (SNAT) protocol session.

17. The apparatus of claim 11, wherein:
the first connection communicatively connects the source network to a first provider network; and
the second connection communicatively connects the source network to a second provider network.

18. The apparatus of claim 17, wherein the means are included in one or more network infrastructure elements that are established at one or more edges of the source network to provide the source network with connectivity to the first and the second provider networks.

19. A non-transitory computer-readable volatile or non-volatile medium storing one or more sequences of instructions which, when executed by one or more processors, cause the one or more processors to perform steps comprising:
receiving outbound data from a source node in a source network;
replacing a source address in a source address field in the outbound data with a first address from a first address pool associated with a first connection;
determining that return traffic on the first connection needs to be switched over to a second connection, wherein a second address pool is associated with the second connection;
generating a mapping that associates the first address with a second address from the second address pool;
based on the mapping, replacing the first address in the source address field in the outbound data with the second address; and
sending the outbound data to the destination node over the second connection.

20. The computer-readable volatile or non-volatile medium of claim 19, wherein the one or more sequences of instructions further comprise instructions which, when executed by the one or more processors, cause the one or more processors to perform:
sending the mapping to a destination logic that is operable to perform network address translation for a destination node;
receiving, on the second connection, inbound data from the destination node, wherein the second address is included in a destination address field in the inbound data;
based on the mapping, replacing the second address in the destination address field in the inbound data with the first address;
replacing the first address in the destination address field in the inbound data with the source address; and
sending the inbound data to the source node.

21. The computer-readable volatile or non-volatile medium of claim 20, wherein:
each of the outbound data and the inbound data comprise one or more segments associated with a Transmission Control Protocol (TCP) connection established between the source node and the destination node;
the source address is a local Internet Protocol (IP) address of the source node in the source network; and
the first address pool is a first pool of IP addresses assigned by a first provider network to the source network, and the second address pool is a second pool of IP addresses assigned by a second provider network to the source network.

22. The computer-readable volatile or non-volatile medium of claim 21, wherein the instructions that cause replacing the first address in the outbound data with the second address and the instructions that cause replacing the second address in the inbound data with the first address are operable to perform address replacement without causing termination of the TCP connection between the source node and the destination node.

23. The computer-readable volatile or non-volatile medium of claim 20, wherein the one or more sequences of instructions further comprise instructions which, when executed by the one or more processors, cause the one or more processors to perform:
receiving an acknowledgement that the destination logic has received the mapping; and
buffering the outbound data until the acknowledgement has been received.

24. The computer-readable volatile or non-volatile medium of claim 20, wherein the instructions that cause sending the mapping comprise instructions which, when executed by the one or more processors, cause the one or more processors to perform sending the mapping to the destination logic over a Stateful NAT (SNAT) protocol session.

25. The computer-readable volatile or non-volatile medium of claim 19, wherein:
the first connection communicatively connects the source network to a first provider network; and
the second connection communicatively connects the source network to a second provider network.

26. The computer-readable volatile or non-volatile medium of claim 25, wherein the one or more sequences of instructions are stored in one or more network infrastructure elements that are operable to be established at one or more edges of the source network to provide the source network with connectivity to the first and the second provider networks.

* * * * *